(12) United States Patent
Ahrens et al.

(10) Patent No.: US 8,192,674 B2
(45) Date of Patent: Jun. 5, 2012

(54) PROCESS AND APPARATUS FOR THE PRODUCTION OF A STRUCTURE, IN PARTICULAR AN AIRCRAFT STRUCTURE, FROM A FIBER COMPOSITE MATERIAL

(75) Inventors: Dieter Ahrens, Harsefeld (DE); Heinz Bardenhagen, Stade (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/533,329

(22) Filed: Jul. 31, 2009

(65) Prior Publication Data
US 2010/0035016 A1   Feb. 11, 2010

Related U.S. Application Data

(60) Provisional application No. 61/086,247, filed on Aug. 5, 2008.

(30) Foreign Application Priority Data

Aug. 5, 2008   (DE) .................. 10 2008 036 349

(51) Int. Cl.
*B29C 51/10* (2006.01)
*B29C 51/12* (2006.01)
*B29C 51/14* (2006.01)

(52) U.S. Cl. .................. 264/510; 264/511; 264/571

(58) Field of Classification Search .................. None
See application file for complete search history.

(56) References Cited

U.S. PATENT DOCUMENTS

| | | | | |
|---|---|---|---|---|
| 4,065,340 A | * | 12/1977 | Dickerson | 156/154 |
| 4,622,091 A | * | 11/1986 | Letterman | 156/286 |
| 4,942,013 A | * | 7/1990 | Palmer et al. | 264/511 |
| 5,106,568 A | * | 4/1992 | Honka | 264/510 |
| 5,236,646 A | * | 8/1993 | Cochran et al. | 264/102 |

FOREIGN PATENT DOCUMENTS

| | | |
|---|---|---|
| DE | 10 2006 050 579 | 3/2008 |
| DE | 10 2007 004 312 | 7/2008 |
| WO | WO 2006/112823 | 10/2006 |

\* cited by examiner

*Primary Examiner* — Monica A Huson
(74) *Attorney, Agent, or Firm* — Sunstein Kann Murphy & Timbers LLP

(57) ABSTRACT

The invention concerns an apparatus and a process for the production of a structure from fiber composite material, comprising a mold tool for receiving material which can be joined to provide a structure, and a vacuum system for molding and fixing the structure, wherein the vacuum system has a flexible layer, in particular a separation film or separation layer and/or a tear-off film, and a vacuum film for covering the structure. In accordance with the invention the vacuum system is free from ventilation material and/or tear-off material at least at a portion which corresponds to a portion of the structure to be covered, in which a step extends.

17 Claims, 3 Drawing Sheets

PROCESS AND APPARATUS FOR THE PRODUCTION OF A STRUCTURE, IN PARTICULAR AN AIRCRAFT STRUCTURE, FROM A FIBER COMPOSITE MATERIAL

PRIORITY

The present application claims priority from the U.S. Provisional Application 61/086,247, filed Aug. 5, 2008, and German Application DE 10 2008 036 349.9, also filed Aug. 5, 2008, both of which are hereby incorporated by reference in their entireties.

FIELD OF THE INVENTION

The present invention concerns a process for the production of a structure, in particular from a fiber composite material.

BACKGROUND OF THE INVENTION

Fiber composite materials are used in particular in relation to applications in which there is a requirement for high weight-specific strength and stiffness. That includes in particular also aviation and space travel. For example fiber composite plastic (FCP) is frequently used as the fiber composite material. Fiber composite plastics typically have a mesh or structure of reinforcing fibers enclosed by a plastic matrix. Components consisting of those or similar fiber composite materials are produced in the state of the art by means of various processes in each of which a structure in the form of the component is hardened by means of applying pressure and high temperatures. To produce components of complex geometry, molds are typically used, into which the fiber composite material is introduced and in which it is hardened. Such molds may be closed—that is to say completely enclosing the component—or open.

SUMMARY OF THE INVENTION

The present invention concerns a process for the production of a structure, in particular from a fiber composite material, including the steps: placing at least one material layer of fiber composite material as a structure in a mold tool, wherein the material layer of fiber composite material is impregnated in particular with a fluid material, applying a flexible layer, in particular a tear-off film and/or separation film or separation layer, to the structure, applying a vacuum film to the structure, producing a reduced pressure between the vacuum film and the mold tool so that the structure is fixed, and heating and hardening the structure, in particular by means of an autoclave.

The invention further concerns an apparatus for the production of a structure from fiber composite material, comprising a mold tool for receiving material which can be joined to provide a structure, and a vacuum system for molding and fixing the structure, wherein the vacuum system has a flexible layer, in particular a separation film or separation layer and/or a tear-off film, and a vacuum film for covering the structure.

The invention further concerns a structure comprising at least one material layer of fiber composite material, and one or more further layers and/or reinforcements of fiber composite material or an alternative material, in particular light metal, which are fixedly connected together.

As mentioned above, open and/or closed molds may be used during the production process. When using open molds, only the surface of the component which is in contact with the surface of the mold tool is defined by the geometry of the mold tool. The portions of the component, which are defined by the mold tool, are either positioned in freely standing relationship and during production fixed by means of the vacuum film and/or defined and produced by means of additional fixed or flexible mold portions. The molds are typically heated to harden the fiber composite material. That is effected either by a heating system integrated into the mold tool or by external heating devices.

The pressure required for fixing and hardening the structure to be produced is typically applied to the fiber composite material or the component in particular when using open molds by means of the vacuum system. The production of components of high complexity at high pressures and temperatures is typically effected using an autoclave. In the processes and apparatuses known from the state of the art the component to be produced is completely covered by a series of different films and layers which are all in turn enclosed by a vacuum film on the one hand and the mold tool on the other hand. At least one of those layers comprises a ventilation material which in accordance with the opinion hitherto of the men skilled in the art is intended to ensure uniform air guidance operative everywhere so that the material can be uniformly compacted. In addition gases which are possibly developed and upwardly moving air inclusions are to be dispersed through the ventilation material.

It is precisely complex components which partially or completely comprise a fiber composite material that are typically composed of a base laminate and further reinforcing and connecting component parts. Those elements can be in the form of fiber composite components which are already hardened, in the form of components of other materials, and in the form of additional fiber composite material laminates. Steps, shoulders or inclined surface portions occur by virtue of that kind of configuration in respect of the component structure, in particular at the side remote from the mold tool, by virtue of the addition of the additional component parts. Such steps and so forth are covered by the vacuum system like also the rest of the structure. In that respect, in the ideal case, the configuration of the individual films and layers of the system exactly follows the surface configuration of the structure.

The production of such composite fiber material components or structures by means of an autoclave is typically effected having regard to various determining factors. In regard to the constitution of the structures to be produced and in regard to the constitution of the production apparatus, attention is to be paid to careful adaptation and/or positioning of the parts when various laminate parts are to be assembled to afford integral structures by means of additional pressing pieces. Those pressing pieces can be for example pressing plates which sandwich-like receive the fiber composite material parts between themselves and a mold tool. If prepregs—fiber composite structures pre-impregnated with matrix material—are used for the production procedure, it is to be noted that they already have a certain adhesive action to each other or are sticky, in the non-hardened state. That causes difficulty with or prevents separation of the individual layers from each other. If the adhesiveness of the parts is to be reduced for example by cooling, it is to be noted whether the components have been suitably checked and are suitable for such a process.

In regard to a system with a vacuum film, care is to be taken to ensure that all regions of the components under the film can be evacuated and there are no regions which are screened off or shielded, by the pressure acting from the exterior. In that case the vacuum film is to be laid over the system and is to be oriented under a slight reduced pressure, so that no membrane regions occur and there are sufficient expansion folds which can prevent the film from breaking open as a consequence of the autoclave pressure and the elevated temperatures. A peripherally extending suction passage which for example comprises wire mesh is connected to the individual zones of the component to be produced in such a way that a vacuum can be satisfactorily produced. If separation films are used for the vacuum system, care is to be taken to ensure that no inclusions which then cannot be evacuated are formed due to fold formation. In general the system should be of such a configuration that the films used do not cover the entire suction passage, but rather a portion of the suction passage remains free, and a connection is made with the vacuum mesh. To achieve a free flow of resin the necessary resin catch spaces in the system may not be covered by film. Further attention is paid to preventing resin accumulations on surfaces. They occur in particular if a film is laid without a smoothing intermediate layer over the laminate and covers it. Resin can accumulate in each fold in the film.

Checking of the production procedure is effected by producing control samples which are hardened under the identical conditions to the component.

In regard to the arrangement of measurement connections and suction connections for processing in the autoclave, a further aspect of significance is that homogenous evacuation of the system is made possible. That typically leads to a diagonal arrangement of the connections. It will be noted however that the exact arrangement of the connections depends on the specifications of the components to be produced.

To acquire knowledge about the temperature of the component to be produced and about the temperature distribution, the system is provided with thermocouple elements. The arrangement of the thermocouple elements and the number thereof depends on the component geometry, the size, and the occupancy of the autoclave. Typically at least three thermocouple elements per component are used. Those elements are partially thermally insulated and coupled to the parts of the apparatus or the laminate in such a way that the actual component temperature is ascertained. To prevent damage to thermocouple elements near the edge, they are typically wrapped with adhesive strip.

If the fiber composite material component to be produced has regions in which exothermic reactions can occur during the hardening process the reaction temperature at those locations in the hardening apparatus is to be additionally monitored and possibly documented by means of reference measurements. In addition the above-mentioned process control samples are also monitored with a separate thermocouple element. Further production conditions and demands depend on the respective individual situation and are established separately.

The known processes and apparatuses suffer from the disadvantage that the materials of the vacuum system and in particular the ventilation material only insufficiently closely adapt to the configuration of the surface of the structure. The materials involved are not sufficiently flexible and consequently do not bear precisely against the surface, in particular in the region of shoulders, steps and so forth. Consequently a respective air-filled cavity is sometimes produced at the shoulders, steps and so forth. During the hardening operation fiber and also matrix material is driven out of the adjacent material layers into the cavity and fills it up. The occurrence of that undesired accumulation of material has the consequence that resin is lacking in the adjacent layers of material and in addition the reinforcing fibers of the material are deflected in an undesirable fashion. That results in the strength values of the material being made worse. Furthermore the accumulations of material formed at the shoulders, steps and so forth are sometimes an impediment in regard to mounting further components on the structure, in particular if a component is to be fitted in directly adjoining relationship with a step. In that case the accumulation of material prevents placement of the component against the step. Air inclusions which possibly remain in the material further worsen the strength of the structure. The worsenings in the strength of the structure, caused by the production procedure, must be taken into consideration in designing the structures. Consequently such structures which are correspondingly designed are heavier and larger than they would have to be in the ideal situation, which particularly in aircraft construction results in a lower aircraft payload and a higher kerosene consumption as well as higher production costs.

Accordingly the object of the present invention is to alleviate as far as possible the disadvantages found in the state of the art and to provide an improved process and an improved apparatus for the production of a structure, in particular for aircraft.

That object is attained by a process of the kind set forth in the opening part of this specification, in which at least a portion of the structure in which a step extends remains free from ventilation material and/or tear-off material.

It has been found that, contrary to the prevailing view on the part of the men skilled in the art, surprisingly there is no need for a use of ventilation material, which covers over the entire surface of the structure.

During hardening by means of high temperatures and pressures the viscosity of the matrix material firstly decreases. In dependence on the permeability of the reinforcing fibers within the material layer of fiber composite material, quasi-hydrostatic conditions occur. It is irrelevant in that respect whether the entire fiber composite material structure is covered over by a complete vacuum system.

The process is improved in particular by virtue of the fact that the procedure provides for improved adaptation of the vacuum system to the structure contour. If the only limitedly flexible ventilation material is at least partially dispensed with and instead only a flexible layer is applied to the structure in particular at the portions where steps extend, for example tear-off material, that provides for markedly closer intimate conformation to the structure. Tear-off material also acts as a ventilation material as long as it is still not completely impregnated with matrix material and promotes close conformational application and better evacuation of the fiber composite material structure.

In regard to known processes and apparatuses for the production of a structure from a fiber composite material, it had been assumed that the ventilation material served not only to evacuate or ventilate the space between the vacuum film and the mold tool, and in that way to apply forces to the fiber composite material structure by means of the vacuum film, but also to dissipate gases which possibly develop and upwardly moving air bubbles. In some instances, the vacuum material may essentially act as a conduit for translating the vacuum along the surface of the structure and corresponding layers.

It has been found that, contrary to previous assumptions, the ventilation material does not promote the rise of air inclusions and reaction gases. Rising gases or air bubbles accumulate at the laminate surface and do not have to be further carried away. That applies in particular if the laminate surface is covered by tear-off material which is removed after hardening is complete.

It has further been found that a possible rise on the part of air bubbles and reaction gases is promoted only by the decreasing viscosity of the matrix at increasing temperature. As however the volume of the gas inclusions decreases at the same time as a result of the process pressure and the permeability of the reinforcing fibers also decreases, a rise on the part of such gases is probable only for inclusions near the surface.

By virtue of the fact that the vacuum system in accordance with the present invention is markedly better matched to steps, shoulders and so forth and consequently matrix material migrates out of adjacent laminate layers to a markedly lesser degree, the process according to the invention has a particularly advantageous effect in the form of a marked saving in material and resources, in comparison with the known processes. Steps, shoulders and so forth are only still covered by elastic films or by at least one elastic film. That also markedly reduces the negative effects on stability for the above-indicated reasons. There are markedly reduced limitations for mounting surfaces, by virtue of lesser accumulations of material at the steps. In addition the only slight geometrical changes in the laminate lead to lesser limitations in respect of strength and allow more reserves for designing fiber composite material structures. That promotes weight-optimized design for said structures as well as production at lower cost.

In an advantageous development of the process according to the invention no ventilation material is applied to the structure. That development of the process can be used to advantage in particular when, in addition to the material layer of fiber composite material—that is to say the base laminate—further reinforcing component elements are applied to the structure, which themselves can be arranged sufficiently flexibly and in accurately fitting relationship on the structure. In that case ventilation material is not required at all.

In a further embodiment of the process according to the invention it further includes the step: applying one or more reinforcements to the at least one material layer of fiber composite material, wherein the reinforcement comprises partially or completely hardened fiber composite plastic or an alternative material, in particular a light metal. Such additional components considerably increase the strength of said structures.

In accordance with a further advantageous embodiment of the process according to the invention it further includes one of, a plurality of or all of the steps: applying a separation film or separation layer between the mold tool and the structure, applying tear-off material between the mold tool and the structure, and/or applying resin suction removal material between the mold tool and the structure.

The combination of the various types of films and layers depends on the surface profile of the structure to be produced and the operating parameters of pressure and temperature.

In accordance with a further embodiment of the process according to the invention it further includes the step: applying resin suction removal material between the structure and the vacuum film. Excess matrix material is absorbed with such a resin suction removal material.

In accordance with a further advantageous embodiment of the process according to the invention a vacuum film with integrated separation layer is used. That can be used in particular when the structure of fiber composite material is hardened under higher pressure, for example in an autoclave.

In accordance with still a further advantageous embodiment of the process it further includes the step: introducing a sealing element into the mold tool. The sealing action between the vacuum film and the mold tool is considerably improved by a sealing element being introduced between the vacuum film and the mold tool, the sealing element coming into sealing contact with both elements.

In accordance with a further development of the process according to the invention the vacuum film is brought into sealing contact with the sealing element.

The object of the invention is further attained in an apparatus of the kind set forth in the opening part of this specification, in that the vacuum system is free from ventilation material at least at a portion which corresponds to a portion of the structure to be covered, in which a step extends. The omission of ventilation material, for the reasons which are indicated above, affords better adaptation of the vacuum system to the structure.

In an advantageous development of the apparatus according to the invention the vacuum system is completely free from ventilation material.

In accordance with a further advantageous embodiment of the apparatus according to the invention the vacuum system further has a separation film or separation layer and/or tear-off material and/or resin suction removal material which are respectively arranged between the mold tool and the structure to be fixed.

In accordance with a further advantageous embodiment of the apparatus according to the invention the vacuum system further has resin suction removal material arranged between the structure and the vacuum film.

In a further advantageous embodiment of the apparatus according to the invention the vacuum film is in the form of a vacuum film with integrated separation layer.

In accordance with still a further advantageous embodiment of the apparatus according to the invention the vacuum system has a sealing element which can be brought into sealing contact with the vacuum film and the mold tool.

The object of the invention is further attained insofar as it provides a structure with at least one material layer of fiber composite material, and one or more further layers and/or reinforcements of fiber composite material or an alternative material, in particular light metal, which are fixedly connected together, characterized in that the structure was produced with the process as set forth in one or more of claims 1 through 8.

In accordance with an alternative embodiment of the structure according to the invention it is produced with an apparatus as set forth in one or more of claims 9 through 13.

BRIEF DESCRIPTION OF THE DRAWINGS

The invention is described in greater detail hereinafter by means of advantageous embodiments and with reference to the accompanying drawings in which.

DETAILED DESCRIPTION OF SPECIFIC EMBODIMENTS

Figure 1:
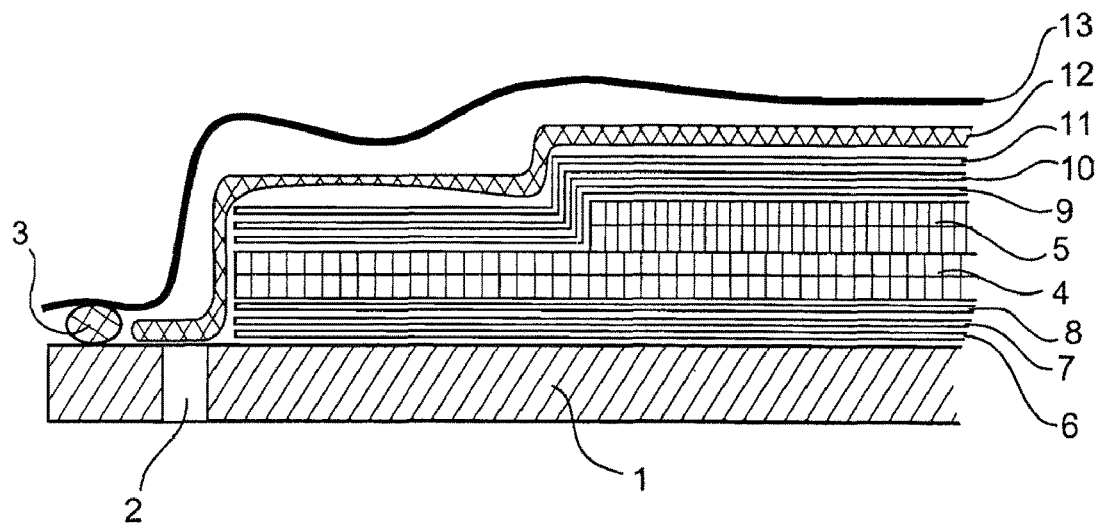
FIG. 1 shows a diagrammatic cross-sectional view of a known apparatus for the production of fiber composite material structures.

FIG. 1 shows the diagrammatic layout of a previously known apparatus for the production of a fiber composite material structure. A mold tool 1 has a connecting opening 2 passing therethrough for the application of a reduced pressure. Arranged on the mold tool is a structure which as the first material layer has a base laminate 4 of fiber composite material and as the second layer a reinforcement 5. Arranged between the mold tool 1 and the base laminate 4 are a separation layer 6, a layer with resin suction removal or absorption material 7 and a layer of tear-off material 8. A further layer of tear-off material 9, a layer of resin suction removal or absorption material 10, a separation film 11 and a layer of ventilation material 12 are arranged between the structure and a vacuum film 13 in such a way that they cover over the entire surface of the structure. In addition disposed between the vacuum film 13 and the mold tool 1 is a sealing element 3 which is in sealing contact both with the vacuum film 13 and also with the mold tool 1.

As indicated in this Figure, the adaption capability of the ventilation material 12 to the surface of the structure is limited. Particularly in relation to structures as are shown by way of example in FIG. 2, it will be readily seen that an increasing number of steps and shoulders in a structure cause further difficulty in adaptation of the vacuum system known from the state of the art.

Figure 2:
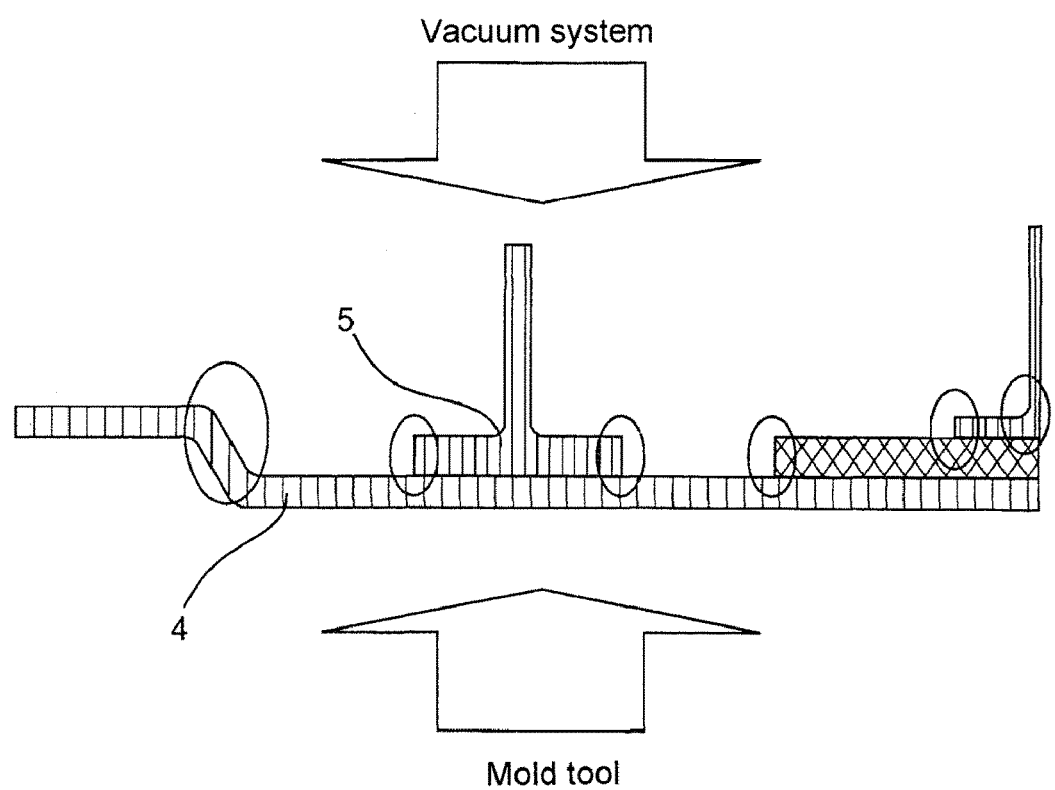
FIG. 2 shows a diagrammatic cross-sectional view of a structure of fiber composite material with a plurality of components.

The layout by way of example shown in FIG. 2 of a structure comprising a plurality of components has a material layer 4 of fiber composite material on which there are additionally also arranged a T-shaped reinforcing element comprising fiber composite material which has already hardened, as well as further reinforcing elements of fiber composite material. Those additional component parts are assembled to the base laminate 4 under high pressures and temperatures.

Figure 3:
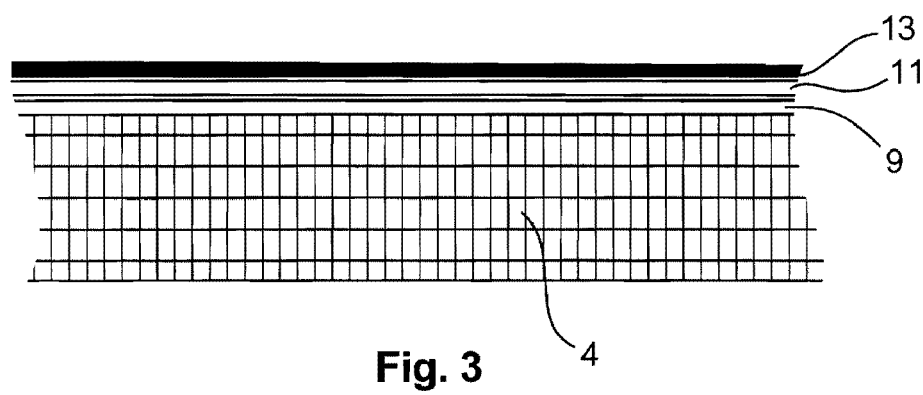
FIG. 3 shows a diagrammatic cross-sectional view of a structure according to the invention with applied vacuum system.
Figure 4:
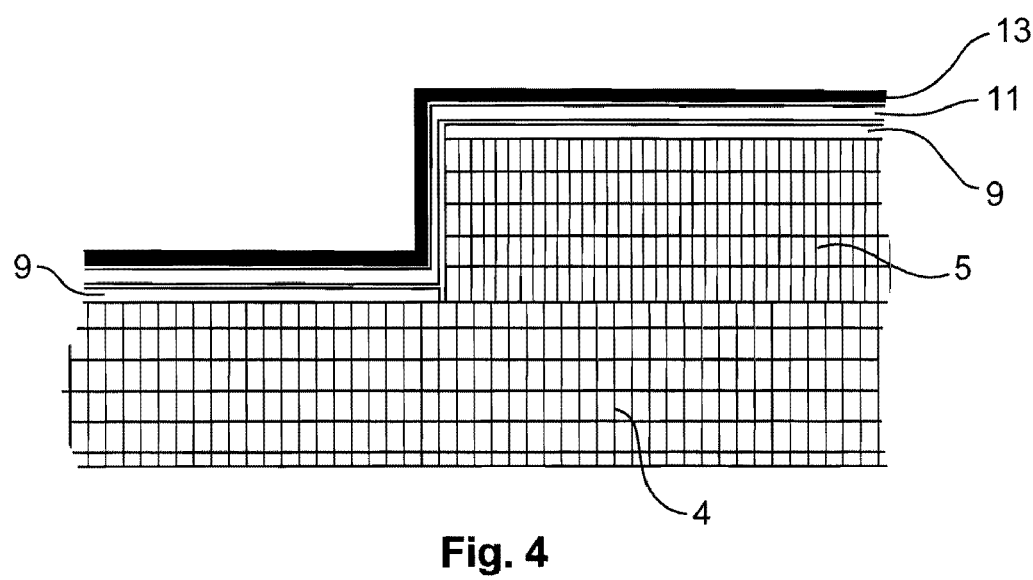
FIG. 4 shows a diagrammatic cross-sectional view of a further embodiment of a structure according to the invention with applied vacuum system.
Figure 5:
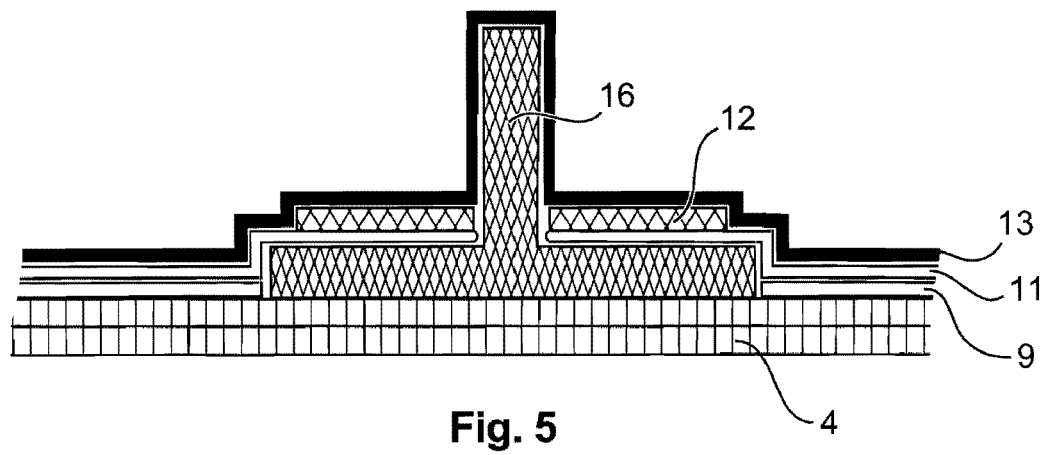
FIG. 5 shows a diagrammatic cross-sectional view of still a further alternative embodiment of a structure according to the invention with applied vacuum system.

FIGS. 3, 4 and 5 show by way of example various possible arrangements of various kinds of films on a structure in accordance with the invention. FIG. 3 shows a flat constitution of the structure. The illustrated structure only comprises a base laminate 4, a superposed layer of tear-off material 9, a separation film 11 and a vacuum film 13. The tear-off material 9, the separation film 11 and the vacuum film 13 in this case form the vacuum system. FIG. 4 shows a portion of a structure in which a step extends. That step is produced by the transition from a reinforcing element 5 to the base laminate 4. As in FIG. 3 the vacuum system in this case also only comprises tear-off material 9, separation film 11 and vacuum film 13. The reinforcement 5 is assembled to the base laminate 4. It is to be noted however that in addition to the complete omission of ventilation material, the tear-off material has in addition also been omitted in the region of the step. Separation of the tear-off material is intended to prevent a relaxation effect as much as possible. It has been found that, with such an arrangement, the formation of cavities is extremely slight.

Finally FIG. 5 shows a structure with applied T-shaped reinforcing component part 16. It has been found that a high contact pressure is necessary for molding thereon a reinforcing element which has already hardened and is of low flexibility. To achieve that, in accordance with the invention the use of ventilation material is only partially dispensed with. In the regions where the T-shaped reinforcing element 16 is to be formed on the base laminate 4, portions of ventilation material 12 are disposed between the reinforcing element 16 and the vacuum film 13. They are additionally also separated from the reinforcing element 5 by the separating film 11. It is to be noted in this respect that the ventilation material does not extend completely over the width of the limbs of the reinforcing element 16, but already ends at some distance before the step between the reinforcing element 16 and the base laminate 4 so that the films or layers which are more flexible (in comparison with the ventilation material) can better adapt intimately to the structure.

In accordance with some embodiments, the ventilation material 12 may be discontinuous and/or interrupted at one or more locations at or along the structure. For example, the ventilation material 12 may cover the connecting opening 2 within the mold tool 1 and may be interrupted at one or more steps, shoulders, vertical bends, or other vertical portions/planes of the structure. In further embodiments, the ventilation material 12 may be located only on the horizontal, planar surfaces of the structure and may be absent at each of the vertical surfaces. Alternatively, in other embodiments, the ventilation material 12 may be limited to placement on the mold tool and may be completely absent from the structure, reinforcement element 5, and/or reinforcement component 16 (e.g., there is no ventilation material to conduct the vacuum across the structure).

In a similar manner, the tear-off material 9 can also be discontinuous and/or interrupted at various locations. For example, the tear-off material 9 may extend along the horizontal surfaces of the structure and may be interrupted at one or more steps, shoulders, vertical bends, or other vertical portions of the structure. In a preferred embodiment, the tear-off material 9 may be interrupted at each non-horizontal plane (e.g., the vertical portion of a step, shoulder, bend, etc.) of the structure. In other words, like the ventilation material 12, the tear-off material 9 may be located only on the horizontal planar surface(s) of the structure and may be absent from the non-horizontal surfaces/planes of the structure.

Figure 6:
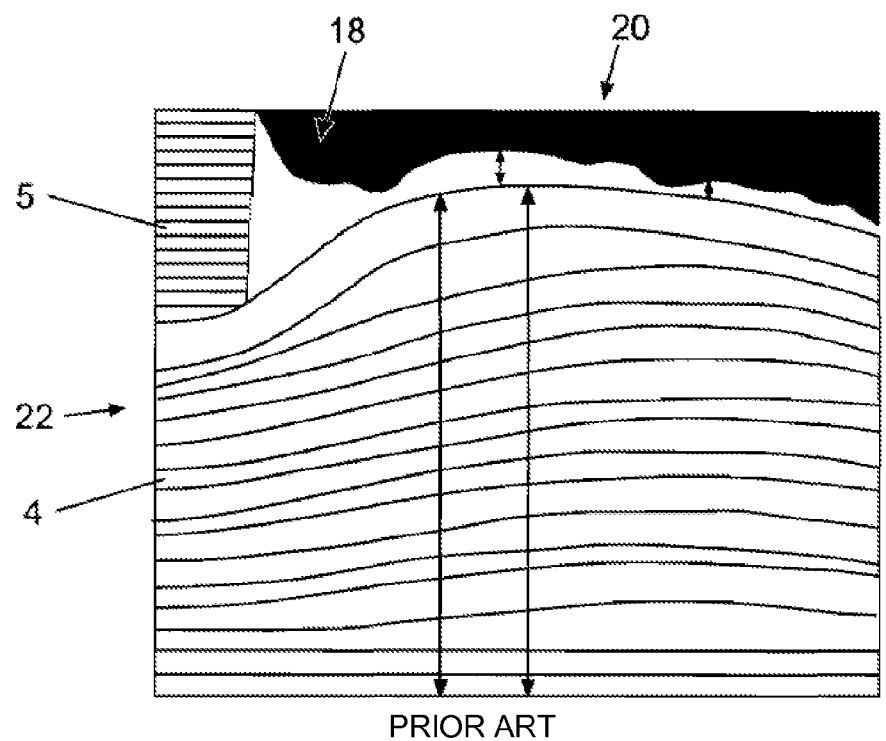
FIG. 6 shows a stylized cross-sectional view of a fiber composite structure.

FIG. 6 shows a stylized cross-sectional microsection surface of a fiber composite structure produced in accordance with a previously known process. By reference to that Figure it is possible to see markedly different negative effects of the known process. It illustrates the region of a step at which a reinforcement 5 has been applied to a base laminate 4 and joined thereto. An accumulation of material 18 has formed in the region of the step. In an adjacent portion 20, there is a marked deflection of the fibers out of their original arrangement and orientation. It can further be seen that a reduction in thickness has been produced in a region 22, as a consequence of migration of matrix material. Those negative effects are not merely optically perceptible but also manifest themselves in a worsening in the strength of the component.

Figure 7:
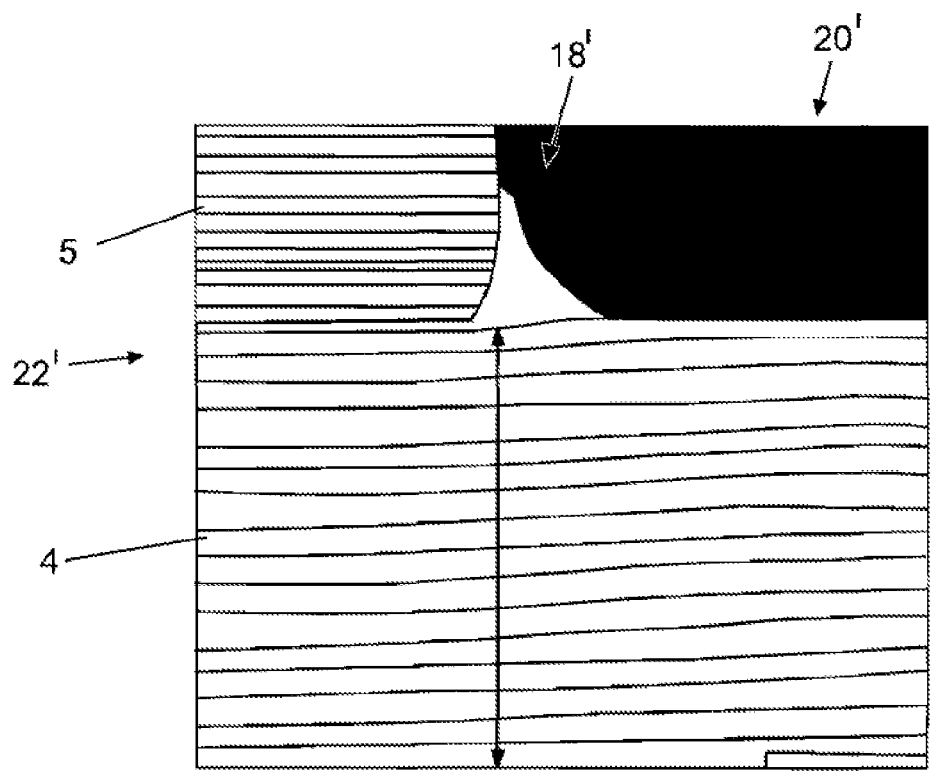
FIG. 7 shows a stylized cross-sectional view of a further fiber composite structure.

In contrast to FIG. 6 FIG. 7 shows a stylized ground section of a hardened fiber composite material structure according to the present invention. FIG. 7 also shows a component portion in which there is a step. At that step there is a portion 18' in which an accumulation of material is formed. It will be apparent in comparison with FIG. 6 however that the accumulation 18' of material is markedly smaller than the accumulation 18 of material. Furthermore the fibers of the base laminate 4 are still arranged and oriented substantially the same in a region 20' as in a region 22' beneath the reinforcement 5. The influences on the internal structure of the fiber composite material which has been produced with a process according to the present invention and/or with an apparatus according to the present invention are substantially less. Almost no reductions in thickness occur and there are markedly lesser limitations in terms of structure strength than with the structure of the state of the art shown in FIG. 6.

What is claimed is:

1. A process for the production of a structure from a fiber composite material comprising:
   placing at least one layer of pre-impregnated fiber composite material in a mold tool to form the structure and at least one step within the structure, wherein the at least one layer of pre-impregnated fiber composite material is pre-impregnated with a fluid material, the structure having a base, each of the at least one step having a vertical surface extending from the base and a horizontal surface;
   applying a layer of tear-off material to the base, the applied layer of tear-off material extending from an edge of the structure to the vertical surface of the at least one step;
   applying a vacuum film to the structure, the vacuum film extending over the structure and the at least one step;
   producing a reduced pressure between the vacuum film and the mold tool so that the structure is fixed; and
   heating and hardening the structure.

2. A process according to claim 1, further comprising:
   applying a flexible layer to the structure, wherein the flexible layer is at least one of a separation film, and a separation layer.

3. A process according to claim 1, wherein heating and hardening the structure includes heating and hardening the structure using an autoclave.

4. A process according to claim 1 characterized in that no ventilation material is applied to the structure.

5. A process according to claim 1 and further including:
   applying one or more reinforcements to the at least one material layer of fiber composite material.

6. A process according to claim 5, wherein the reinforcement comprises at least one of a partially hardened fiber composite plastic, a completely hardened fiber composite plastic, and a light metal.

7. A process according to claim 1 further including:
   applying a separation film or separation layer between the mold tool and the structure.

8. A process according to claim 1 further including:
   applying tear-off material between the mold tool and the structure.

9. A process according to claim 1 further including:
   applying resin suction removal material between the mold tool and the structure.

10. A process according to claim 1 and further including:
    applying resin suction removal material between the structure and the vacuum film.

11. A process according to claim 1 characterized in that a vacuum film with integrated separation layer is used.

12. A process according to claim 1 further including:
    introducing a sealing element into the mold tool.

13. A process according to claim 1 characterized in that the vacuum film is brought into sealing contact with the sealing element.

14. A method according to claim 1, further comprising:
    applying a layer of ventilation material to the horizontal surface of at least one of the at least one step.

15. A method according to claim 1, further comprising:
    applying a second layer of tear-off material to the horizontal surface of at least one of the at least one step.

16. A method according to claim 1, further comprising;
    applying a layer of separation material to the structure, the layer of separation material extending over the base, the vertical surface of the step, and the horizontal surface of the step.

17. A method according to claim 16, wherein the layer of separation material is between the tear-off material and the vacuum film.

* * * * *